(12) United States Patent
Eum et al.

(10) Patent No.: US 12,267,004 B2
(45) Date of Patent: Apr. 1, 2025

(54) METHODS AND SYSTEMS OF POWER-FACTOR-CORRECTION CONVERTERS

(71) Applicant: SEMICONDUCTOR COMPONENTS INDUSTRIES, LLC, Phoenix, AZ (US)

(72) Inventors: Hyunchul Eum, Chandler, AZ (US); Giyoung Chun, Goyang (KR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 273 days.

(21) Appl. No.: 18/169,656

(22) Filed: Feb. 15, 2023

(65) Prior Publication Data
US 2024/0275272 A1 Aug. 15, 2024

(51) Int. Cl.
*H02M 1/42* (2007.01)
(52) U.S. Cl.
CPC ................. *H02M 1/4208* (2013.01)
(58) Field of Classification Search
CPC ............. H02M 1/4208; H02M 1/4225; H02M 3/1584; H02M 3/1586; H02M 1/08
See application file for complete search history.

(56) References Cited

U.S. PATENT DOCUMENTS

| | | | | |
|---|---|---|---|---|
| 5,880,940 A | * | 3/1999 | Poon ................. | H02M 1/34 323/224 |
| 6,008,630 A | * | 12/1999 | Prasad ................. | H02M 1/34 323/222 |
| 6,163,139 A | * | 12/2000 | Symonds .............. | H02M 3/156 323/344 |
| 2011/0199797 A1 | | 8/2011 | Bridge et al. | |
| 2016/0276924 A1 | | 9/2016 | Castelli | |

OTHER PUBLICATIONS

Onsemi, "Interleaved Dual BCM PFC Controllers", FAN9611/D, Rev. 2, Apr. 2022, 36 pages.

* cited by examiner

*Primary Examiner* — Adolf D Berhane
*Assistant Examiner* — Afework S Demisse
(74) *Attorney, Agent, or Firm* — Dickinson Wright PLLC; Mark E. Scott

(57) ABSTRACT

PFC converters. One example is a method of operating a power converter, the method comprising: charging a first-phase inductance of a first boost converter, and then discharging the first-phase inductance, the charging and discharging defines a first switching period of the first boost converter; asserting, during the first switching period, a sync-two signal based on a duration of a prior switching period of the first boost converter and an offset value; asserting, during the first switching period, a valley-two signal when current through a second-phase inductance of a second boost converter reaches a predetermined valley current; responsive to the assertion of the sync-two signal and the valley-two signal, charging the second-phase inductance, and then discharging the second-phase inductance; and responsive to relative timing of the assertion of the sync-two signal and assertion of the valley-two signal, modifying the offset value.

20 Claims, 7 Drawing Sheets

METHODS AND SYSTEMS OF POWER-FACTOR-CORRECTION CONVERTERS

CROSS-REFERENCE TO RELATED APPLICATIONS

Not Applicable.

BACKGROUND

Power factor in an AC system is a relationship between timing of AC current drawn by a load and the AC voltage supplied from the source. In converting AC to DC for use by modern electronic equipment, DC-DC switching power converters present non-linear impedance with respect to AC mains, and thus have poor power factor. To address the issue, many systems implement a power-factor-correction converter (PFC converter), itself a switching power converter, prior to the downstream DC-DC switching power converter.

SUMMARY

One example is a method of operating a power converter, the method comprising: charging a first-phase inductance of a first boost converter, and then discharging the first-phase inductance through a first diode, the charging and discharging defines a first switching period of the first boost converter; asserting, during the first switching period, a sync-two signal based on a duration of a prior switching period of the first boost converter and an offset value; asserting, during the first switching period, a valley-two signal when current through a second-phase inductance of a second boost converter reaches a predetermined valley current; responsive to the assertion of the sync-two signal and the valley-two signal, charging the second-phase inductance, and then discharging the second-phase inductance through a second diode, the charging and discharging of the second-phase inductance defines a first switching period of the second boost converter; and responsive to relative timing of the assertion of the sync-two signal and assertion of the valley-two signal, modifying the offset value.

In the example method, asserting the valley-two signal may be performed when the predetermined valley current is in a predetermined valley count.

In the example method, modifying the offset value may further comprise modifying the offset value when the assertion of the valley-two signal precedes the assertion of the sync-two signal, indicating a lack of valley switching for the charging of the of the second-phase inductance.

The example method may further comprise: asserting, during the first switching period of the second boost converter, a sync-one signal based on a duration of a prior switching period of the second boost converter and the offset value; asserting, during the first switching period of the second boost converter, a valley-one signal when current through the first-phase inductance reaches a predetermined valley current; responsive to the assertion of the sync-one signal and the valley-one signal, again charging the first-phase inductance, and then again discharging the first-phase inductance through the first diode, defining a second switching period of the first boost converter; and wherein modifying the offset value further comprises, responsive to relative timing of the assertion of the sync-one signal and assertion of the valley-one signal, modifying the offset value. Asserting the valley-one signal may further comprise asserting the valley-one signal when current through the first-phase inductance reaches the predetermined valley current in the predetermined valley count. Modifying the offset value may further comprise modifying the offset value when assertion of the valley-one signal precedes the assertion of the sync-one signal, indicating a lack of valley switching for the charging of the of the first-phase inductance. Modifying the offset value may further comprise modifying the offset value when assertion of the valley-one signal precedes assertion of the sync-one signal and assertion of the valley-two signal precedes the assertion of the sync-two signal, indicating valley a lack of valley switching for charging of both the first-phase and the second-phase inductance.

Yet another example is a controller for controlling a power-factor-correction converter with a first boost converter and a second boost converter, the controller comprising: a first-phase sense terminal, a first-phase drive terminal, a second-phase sense terminal, a second-phase drive terminal, and a feedback terminal; a first valley detector coupled to the first-phase sense terminal and defining a valley-one output, the first valley detector configured to assert the valley-one output responsive to a voltage valley sensed by way of the first-phase sense terminal; a first synchronizer coupled to the valley-one output and defining a sync-two output and a first offset input, the first synchronizer configured to assert the sync-two output based on duration of a switching period of a previous switching cycle of the first boost converter and an offset signal received on the first offset input; a second valley detector coupled to the second-phase sense terminal and defining a valley-two output, the second valley detector configured to assert the valley-two output responsive to a voltage sensed by way of the second-phase sense terminal; a second synchronizer coupled to the valley-two output and defining a sync-one output and a second offset input, the second synchronizer configured to assert the sync-one output responsive to a duration of a switching period of a previous switching cycle of the second boost converter and the offset signal received on the second offset input; a first-phase driver coupled to the first-phase drive terminal, the valley-one output, and the sync-one output, the first-phase driver configured to assert the first-phase drive terminal responsive to assertion of the valley-one output and the sync-one output; a second-phase driver coupled to the second-phase drive terminal, the valley-two output, and the sync-two output, the second-phase driver configured to assert the second-phase drive terminal responsive to assertion of the valley-two output and the sync-two output; and an offset controller coupled to the valley-one output, the sync-one output, the valley-two output, and the sync-two output, the offset controller configured to drive an offset signal to the first and second offset inputs. The offset controller may be configured to: increment the offset signal when assertion of the valley-one output precedes the assertion of the sync-one output and assertion of the valley-two output precedes the assertion of the sync-two output, indicating both the first and second phases missed valley switching; and decrement the offset signal on occurrence of at least one situation from a group comprising: assertion of the sync-one output precedes assertion of the valley-one output; and assertion of the sync-two output precedes assertion of the valley-two output.

In the example controller, the first synchronizer may further comprise: a first counter coupled to the valley-one output and the first-phase drive terminal, the first counter configured to measure a duration between assertion of the first-phase drive terminal and the assertion of the valley-one output, and thereby produce a first count value; a first trigger-point controller coupled to the first count value and the offset signal, the trigger-point controller configured to generate a first trigger-point value based on a count value from the previous switching cycle of the first boost converter and the offset value; a first comparator defining first compare input coupled to the first trigger-point value, a second compare input coupled to the first count value, the first comparator configured to assert the sync-two output when the first count value crosses first trigger-point value. The trigger-point controller may further comprise: a first sample and hold circuit configured to read the first count value, produce a half-cycle value, and hold the half-cycle value for a least a portion of a subsequent switching period; and a first summer having a first input coupled to the half-cycle value, a second input coupled to the first offset input, and sum output coupled to the second compare input, the first summer configured to produce a sum signal being the first trigger-point value. The second synchronizer may further comprise: a second counter coupled to the valley-two output and the second-phase drive terminal, the second counter configured to measure a time duration between assertion of the second-phase drive terminal and the assertion of the valley-two output, and thereby produce a second count value; a second trigger-point controller coupled to the second count value and the offset signal, the second trigger-point controller configured to generate a second trigger-point value based on a count value from the previous switching cycle of the second boost converter and the offset value; and a second comparator defining a first compare input coupled to the second trigger-point value, a second compare input coupled to the second count value, and the sync-one output, the second comparator configured to assert the sync-one output when the second count value crosses second trigger-point value.

In the example controller, the first synchronizer may further comprise: a first comparator defining first compare input, a second compare input, and the sync-two output; a first counter coupled to the valley-one output and the first-phase drive terminal, the first counter configured to measure a time duration between assertion of the first-phase drive terminal and the assertion of the valley-one output, and thereby produce a first count value applied to the first compare input; a first sample and hold circuit configured to read the first count value, produce a half-cycle value, and hold the half-cycle value for a least a portion of a subsequent switching period; a first summer having a first input coupled to the half-cycle value, a second input coupled to the first offset input, and a sum output coupled to the second compare input, the first summer configured to produce a sum signal; the second comparator configured to assert the sync-two output when the first count value crosses the sum signal. The second synchronizer may further comprise: a second comparator defining a first compare input, a second compare input, and the sync-two output; a second counter coupled to the valley-two output and the second-phase drive terminal, the second counter configured to measure a time duration between assertion of the second-phase drive terminal and the assertion of the valley-two output, and thereby produce a second count value applied to the first compare input of the second comparator; a second sample and hold circuit configured to read the second count value, produce and hold a half-cycle value for a portion of the subsequent switching period; a second summer having a first input coupled to the half-cycle value of the second sample and hold circuit, a second input coupled to the second offset input, and sum output coupled to the second compare input of the second sample and hold circuit, the second summer configured to produce a sum signal; the second comparator configured to assert the sync-two output when the second count value crosses the sum signal of the second summer.

And yet another example is a PFC converter comprising: a first-phase transformer defining a first primary winding with a first lead coupled to a voltage input and a second lead, and an auxiliary winding defining a first-phase sense lead; a first-phase diode defining an anode coupled to the second lead, and a cathode defining a voltage output; a first-phase electrically-controlled switch defining a first connection coupled to the second lead, a second connection coupled a reference voltage, and a control input; a second-phase transformer defining a second primary winding with a first lead coupled to the voltage input and a second lead, and an auxiliary winding defining a second-phase sense lead; a second-phase diode defining an anode coupled to the second lead of the second-phase transformer, and a cathode coupled to the voltage output; a second-phase electrically-controlled switch defining a first connection coupled to the second lead of the second-phase transformer, a second connection coupled the reference voltage, and a control input; and a controller coupled to the first-phase sense lead, the second-phase sense lead, the control input the first-phase electrically-controlled switch, and the control input of the second-phase electrically-controlled switch. The controller may be configured to: charge the first primary winding, and then discharge the first primary winding through the first-phase diode, the charge and discharge defines a first switching period of the first primary winding; assert, during the first switching period, a sync-two signal based a duration of a prior switching period of the first phase and an offset value; assert, during the first switching period, a valley-two signal when current through the second primary winding reaches a predetermined valley current; responsive to the assertion of the sync-two signal and the valley-two signal, charge the second primary winding, and then discharge the second primary winding through the second-phase diode, the charge and discharge of the second primary winding defines a first switching period of a second phase of the PFC converter; and responsive to relative timing of the assertion of the sync-two signal and assertion of the valley-two signal, modify the offset value.

In the example PFC converter, when the controller asserts the valley-two signal, the controller may be configured to assert the valley-two signal when the predetermined valley current is in a predetermined valley count.

In the example PFC converter, wherein when the controller modifies the offset value, the controller is further configured to modify the offset value when the assertion of the valley-two signal precedes the assertion of the sync-two signal, indicating a lack of valley switching for the charging of the of the second primary winding.

In the example PFC converter, the controller is further configured to: assert, during a first switching period of the second primary winding, a sync-one signal based on a duration of a prior switching period of the second primary winding and the offset value; assert, during the first switching period of the second primary winding, a valley-one signal when current through the first primary winding reaches a predetermined valley current; responsive to the assertion of the sync-one signal and the valley-one signal, again charge the first primary winding, and then again discharge the first primary winding through the first-phase diode, defining a second switching period of the first primary winding; and wherein modification of the offset value further comprises, responsive to relative timing of the assertion of the sync-one signal and assertion of the valley-one signal, modify the offset value. When the controller asserts the valley-one signal, the controller may be further configured to assert the valley-one signal when current through the first primary winding reaches the predetermined valley current in the predetermined valley count. When the controller modifies the offset value, the controller may be further configured to modify the offset value when assertion of the valley-one signal precedes the assertion of the sync-one signal, indicating a lack of valley switching for the charge of the of the first primary winding. When the controller modifies the offset value, the controller may be further configured to modifying the offset value when assertion of the valley-one signal precedes assertion of sync-one signal and assertion of the valley-two signal precedes the assertion of the sync-two signal, indicating a lack of valley switching for charging of both the first and second primary windings.

BRIEF DESCRIPTION OF THE DRAWINGS

For a detailed description of example embodiments, reference will now be made to the accompanying drawings in which.

DEFINITIONS

Figure 1:
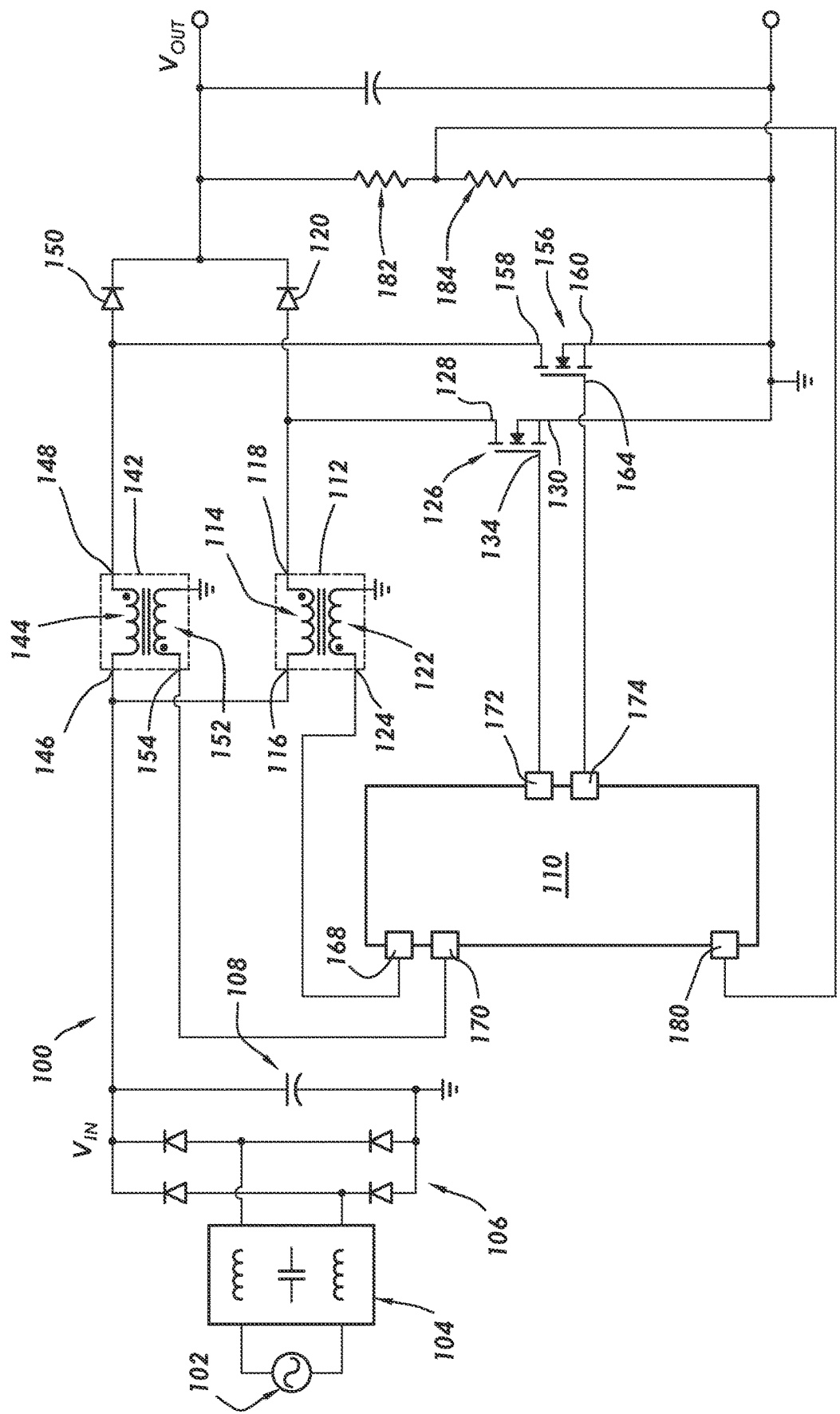
FIG. 1 shows a schematic of a system including a PFC converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an openended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in reference to a recited parameter shall mean the recited parameter plus or minus ten percent (+/−10%) of the recited parameter.

"AC" shall mean alternating current as those terms are understood within electrical engineering.

"DC" shall mean direct current as those terms are understood within electrical engineering.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art understands that the following description has broad application, and the discussion of any embodiment is meant only to be exemplary of that embodiment, and not intended to intimate that the scope of the disclosure, including the claims, is limited to that embodiment.

Various examples are directed to methods and systems of power-factor-correction converters (PFC converters). More particularly, various examples are directed to PFC converters operating two interleaved parallel-connected boost converters. More particularly still, various examples are directed to adjusting trigger points as between the interleaved boost converters to more often achieve valley switching of electrically-controlled switches for each phase as switching periods change with changing rectified input voltage.

FIG. 1 shows a schematic of a system with an example PFC converter 100. In particular, the example system comprises source of AC power 102, such as 120 Volt AC or 240 Volt AC (50 or 60 Hz). The source of AC power 102 is coupled to an electromagnetic interference filter (EMI filter) 104 and a bridge rectifier 106. The example bridge rectifier 106 generates a full wave rectified signal applied to an input capacitor 108. Thus, the voltage input $V_{IN}$ of the PFC converter is coupled to the bridge rectifier 106 and input capacitor 108.

The example PFC converter 100 comprises a transformer 112. The transformer 112 defines a primary winding 114 with a first lead 116 coupled to the voltage input $V_{IN}$, and a second lead 118 coupled to the anode of a diode 120. The cathode of the diode 120 is coupled to the DC voltage output $V_{OUT}$. In one example, the voltage output $V_{OUT}$ may be about 385V for the example voltage input $V_{IN}$ range above. The transformer 112 further includes a secondary or auxiliary winding 122 that defines a sense lead 124 and a second lead coupled to a reference voltage (e.g., ground or common). The primary winding 114 provides inductance for a first boost converter of the interleaved system. The auxiliary winding 122 is used to detect the end of each discharge mode of the inductance provided by the primary winding 114, the detection discussed in greater detail below.

The example PFC converter 100 further comprises an electrically-controlled switch 126 defining a first connection, a second connection, and control input. In many implementations, the electrically-controlled switch 126 is a transistor, such as a field effect transistor, and thus the electrically-controlled switch is hereafter referred to as FET 126. Thus, the example FET 126 defines a drain 128 coupled to the second lead 118 of the primary winding 114 and the anode of the diode 120. The FET 126 defines a source 130 coupled the reference voltage. The FET 126 also defines a gate 134. When the gate 134 is asserted, the FET 126 becomes conductive. When the FET 126 is conductive, current flow through the primary winding 114 rises over time, storing energy in the field surrounding the primary winding 114. Because current through the inductance of the primary winding 114 cannot change instantaneously, when the gate 134 of the FET 126 is de-asserted and the FET 126 becomes non-conductive, the current continues to flow through the diode 120 to the voltage output $V_{OUT}$.

The example PFC converter 100 further comprises another transformer 142. The transformer 142 defines a primary winding 144 with a first lead 146 coupled to the voltage input $V_{IN}$, and a second lead 148 coupled to the anode of a diode 150. The cathode of the diode 150 is coupled to the voltage output $V_{OUT}$. The transformer 142 further defines a secondary or auxiliary winding 152 that defines a sense lead 154 and a second lead coupled to the reference voltage. The primary winding 144 provides inductance for a second boost converter of the interleaved system. The auxiliary winding 152 is used to detect the end of each discharge mode of the inductance provided by the primary winding 144, the detection discussed in greater detail below.

The example PFC converter 100 further comprises an electrically-controlled switch 156 defining a first connection, a second connection, and control input. In many implementations, the electrically-controlled switch 156 is a transistor, and thus here too the electrically-controlled switch is hereafter referred to as FET 156. Thus, the example FET 156 defines a drain 158 coupled to the second lead 148 of the primary winding 144 and the anode of the diode 150. The FET 156 defines a source 160 coupled to the reference voltage. The FET 156 also defines a gate 164. When the gate 164 is asserted, the FET 156 becomes conductive. When the FET 156 is conductive, current flow through the primary winding 144 rises over time, storing energy in the field surrounding the primary winding 144. Because current through the inductance of the primary winding 144 cannot change instantaneously, when the gate 164 of the FET 156 is de-asserted and the FET 156 becomes non-conductive, the current continues to flow through the diode 150 to the voltage output $V_{OUT}$.

Still referring to FIG. 1, the example PFC converter 100 further comprises the PFC controller 110. The example PFC controller 110 defines a first-phase sense terminal 168 and a second-phase sense terminal 170. The first-phase sense terminal 168 is coupled to the sense lead 124 of the transformer 112. While the first-phase sense terminal 168 is shown directly coupled to the sense lead 124, in some cases the coupling may be through a resistor to limit current flow to the PFC controller 110. The second-phase sense terminal 170 is coupled to the sense lead 154 of the transformer 142. Again, while the second-phase sense terminal 170 is shown directly coupled to the sense lead 154, the coupling may be through a resistor to limit current flow to the PFC controller 110.

The PFC controller 110 further defines a first-phase drive terminal 172 and a second-phase drive terminal 174. The first-phase drive terminal 172 is coupled to the gate 134 of the example FET 126. While the first-phase drive terminal 172 is shown directly coupled to the gate 134, in some cases the coupling may be through a resistor to limit inrush current caused by the capacitance of the gate 134. When the PFC controller 110 asserts the first-phase drive terminal 172, thus asserting the gate 134, the example FET 126 becomes conductive. Oppositely, when the PFC controller 110 de-asserts the first-phase drive terminal 172, thus de-asserting the gate 134, the example FET 126 becomes non-conductive. The second-phase drive terminal 174 is coupled to the gate 164 of the example FET 156. While the second-phase drive terminal 174 is shown directly coupled to the gate 164, the coupling may be through a resistor to limit inrush current caused by the capacitance of the gate 164. When the PFC controller 110 asserts the second-phase drive terminal 174, thus asserting the gate 164, the example FET 156 becomes conductive. Oppositely, when the PFC controller 110 de-asserts the second-phase drive terminal 174, thus de-asserting the gate 164, the example FET 156 becomes non-conductive.

Still referring to FIG. 1, the example PFC controller 110 further defines a feedback terminal 180. In the example system, the feedback terminal 180 is coupled to the voltage output $V_{OUT}$ by way of a voltage divider made of resistors 182 and 184. Thus, the PFC controller 110 may sense a signal indicative of the voltage output $V_{OUT}$ as part of the closed-loop control the voltage output $V_{OUT}$. Additional terminals for the PFC controller 110 will be present. For example, additional terminals will be present for the voltage supply and for the common or ground connection. Additional terminals may be present for various design-specific settings, such as a terminal for setting the maximum on-time for each charge mode and a terminal for setting soft-start timing. However, the various additional terminals and connections are not shown so as not to unduly complicate the figure. The specification now turns to example waveforms to orient the reader to several operational concepts and terminology.

Figure 2A:
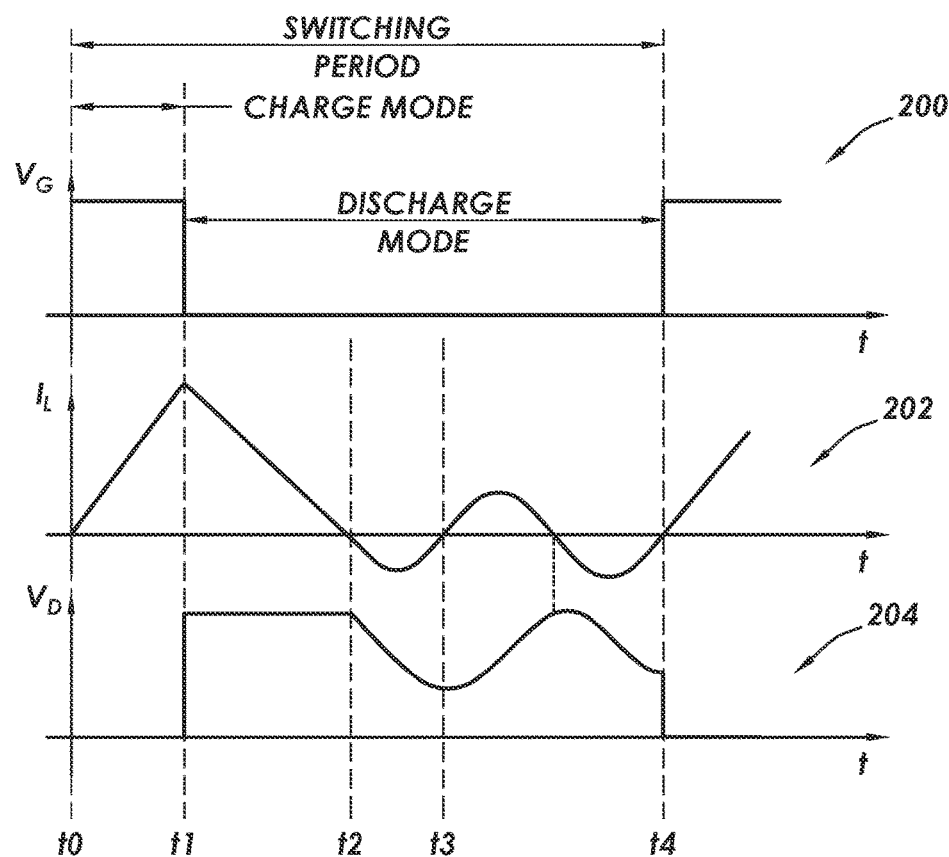
FIG. 2A shows a series of waveforms associated with a single boost converter, in accordance with at least some embodiments.

FIG. 2A shows a series of waveforms associated with a single boost converter. The description that follows is directed to the boost converter made up of transformer 112, FET 126, and diode 120, but the description is equally applicable to the second boost converter. In particular, the upper waveform shows an example first-phase drive signal 200 that may be driven to the gate 134 of the FET 126. The middle waveform shows inductor current 202 through the primary winding 114 of the transformer 112. The lower waveform shows drain voltage 204 of the FET 126. While the waveforms show different parameters, the waveforms are plotting along corresponding time axes.

Referring initially to the first-phase drive signal 200. The example first-phase drive signal 200 is shown to become asserted at time t0, and remain asserted until time t1. In this example, the first-phase drive signal 200 is shown asserted high or with a high voltage, but the asserted state may be arbitrarily selected at the discretion of the circuit designer. When the first-phase drive signal 200 is asserted, the example FET 126 is conductive and thus the current through the primary winding 114 is rising, as shown by the inductor current 202. It follows that, during the same period of time, the voltage at the drain 128 of the FET 126 is effectively zero as shown by the drain voltage 204, neglecting the small voltage drop across the FET 126. The period of time between t0 and t1 is referred to as a charge mode, because the current through the primary winding 114 is ramping upward and energy is being stored in the field surrounding the primary winding 114.

The example first-phase drive signal 200 is shown to become de-asserted at time t1, and remain de-asserted until the next charge mode. When the first-phase drive signal 200 is de-asserted, the example FET 126 is non-conductive and thus the current through the primary winding 114 falls from the peak current as shown by the inductor current 202, but also the current provided by the primary winding 114 is flowing through the diode 120 to the voltage output $V_{OUT}$. During the same period of time, the voltage at the drain 128 of the FET 126 is relatively constant, but then drops when the inductor current 202 reaches zero at time t2.

Still referring to FIG. 2A, and specifically the inductor current 202 waveform. Though the inductor current 202 ramps downward to zero, after the current reaches zero the inductance of the primary winding 114 resonates with the parasitic capacitances of the system, mainly the capacitance of the example FET 126. Thus, the after time t2 the inductor current 202 oscillates as shown in FIG. 2A. The magnitude of the oscillation compared to the magnitude of the peak current during the charge mode is not necessarily to scale in FIG. 2A, and in fact is exaggerated for purposes of clarity. Moreover, the frequency of the period of the oscillations are not to scale, and is also exaggerated.

The oscillations of the inductor current 202 create corresponding oscillations of the drain voltage 204 of the FET 126. The magnitude of the oscillation of the drain voltage 204 compared to the peak magnitude of the voltage is not necessarily to scale, and in fact is exaggerated for purposes of clarity. The oscillation creates peaks and valleys of the drain voltage 204, such as the first valley at time t3 and the second valley at time t4. While the drain voltage 204 waveform shows the drain voltage 204 to reach zero in the first valley at time t3, such is not necessarily the case. Moreover, the oscillations ring down, and thus the valley voltages exponentially approach the magnitude of the voltage input $V_{IN}$ over time.

In accordance with various examples, the PFC controller 110 attempts to begin the next charge mode in a valley of the drain voltage 204. The valley selected is dependent upon the loading the PFC converter 100. For example, for a PFC converter 100 providing high load, the next charge mode may begin contemporaneously with reaching the first valley at time t3 after the inductor current reaches zero at time t2. If the PFC converter 100 is provided a light load, the next charge mode may begin after two or more valleys, such as the second through a fifth valley or more. Switching a FET in the valley is "soft switching" that reduces switching losses and increases overall PFC converter 100 efficiency.

For purposes of explanation, consider that in the example of FIG. 2A the next charge mode begins in the second valley, at time t4. Again, any valley may be selected depending upon the load. The period of time between t1 and the selected valley, for example the valley at time t4, may be referred to as the discharge mode, because during at least a portion of the duration, energy is being provided to the voltage output $V_{OUT}$. The time duration between t0 and the selected valley, comprising both the charge mode and the discharge mode, may be referred to as a switching period.

Figure 2B:
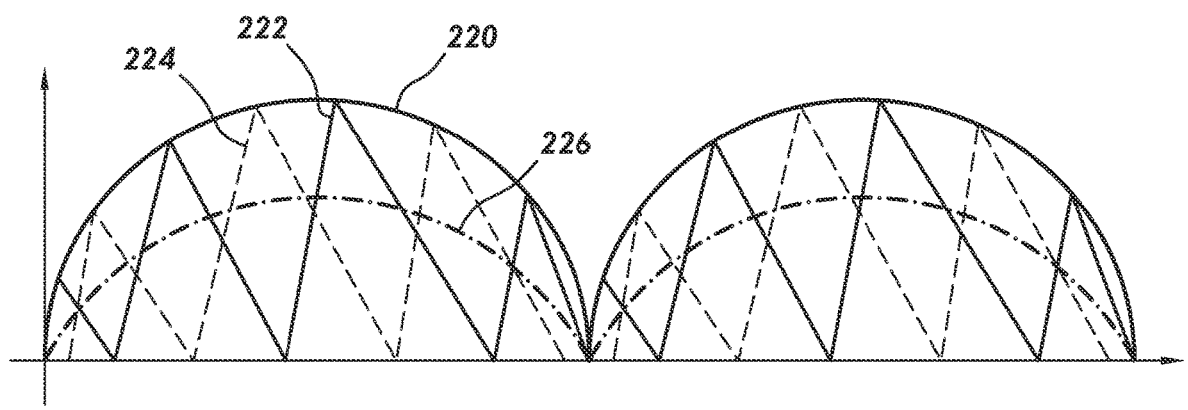
FIG. 2B co-plots an example full-wave rectified signal, and the inductor current of interleaved boost converters.

FIG. 2B co-plots an example full-wave rectified voltage, the inductor current of the interleaved boost converters, and the resultant average current. In particular, visible in FIG. 2B is the full-wave rectified voltage 220, shown as a thicker solid line. If the AC mains are 60 Hz, then the full-wave rectified voltage 220 has frequency of 120 Hz. Co-plotted within the full-wave rectified voltage 220 is a first inductor current 222 from a first interleaved boost converter, the first inductor current 222 shown as the thinner solid line. In practice, the switching frequency of the boost converters may be between about 16 kilo-Hertz (kHz) and about 500 kHz, and thus the relative periods as between the full-wave rectified voltage 220 and the first inductor current 222 are not to scale. However, the simplification does illustrate how the peak current for each charge mode may be directly proportional to the instantaneous value of the full-wave rectified voltage 220. Further co-plotted within the full-wave rectified voltage 220 is a second inductor current 224 from a second interleaved boost converter, the second inductor current 224 shown as a dashed line. Again, the relative periods as between the full-wave rectified voltage 220 and the second inductor current 224 are not to scale. Moreover, the simplification regarding the respective switching periods breaks down as the full-wave rectified voltage 220 approaches the minima, and thus second inductor current is omitted near the minima. However, considering the first inductor current 222 and the second inductor current 224 together, the average current 226, shown as a dash-dot-dash line, is substantially sinusoidal, and thus the power factor of the PFC converter is very close to unity.

In the example system, the switching period for each boost converter is directly proportional to the input voltage. For example, the first switching period for the first inductor current 222 is shorter than the second switching period as the voltage of the full-wave rectified voltage is rising. Oppositely, the switching period whose peak current is reached near the peak of the voltage of the full-wave rectified voltage is longer than the final example switching period in the example waveform.

Figure 3:
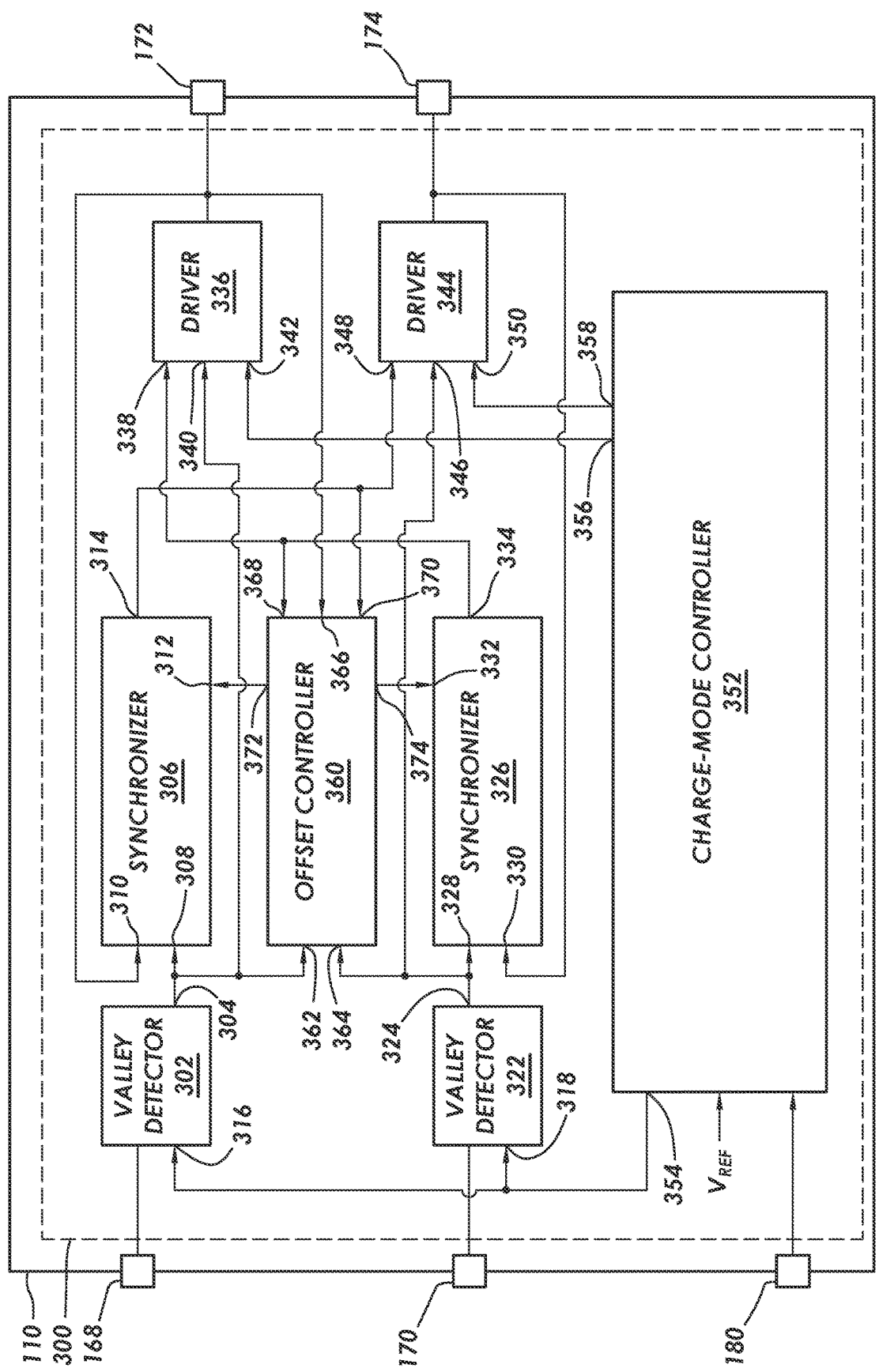
FIG. 3 shows a block diagram of a PFC controller in accordance with at least some embodiments.

FIG. 3 shows a block diagram of the example PFC controller 110. In particular, the PFC controller 110 may comprise electrical devices and circuits monolithically created on a substrate 300 and encapsulated within packaging; however, the functionality of the various components may be embodied on multiple substrates that are co-packaged (e.g., multi-chip module) and coupled to each other and the various terminals. The example PFC controller 110 defines the first-phase sense terminal 168, the second-phase sense terminal 170, the first-phase drive terminal 172, and the second-phase drive terminal 174. Again, additional terminals will be present but are not shown so as not to unduly complicate the figure.

Internally, the example PFC controller 110 defines a valley detector 302 coupled to the first-phase sense terminal 168 and defining a valley-one output 304 and a valley-select input 316. The valley detector 302 is designed and constructed to assert the valley-one output 304 responsive to a voltage sensed on the first-phase sense terminal 168 and an indication of a selected valley received on the valley-select input 316. More particularly, the valley detector 302 is designed and constructed to assert the valley-one output 304 to indicate the reaching the selected valley of the oscillations of the voltage on the drain 128 the example FET 126. For example, if the selected valley is the first valley, the valley detector 302 may be designed and constructed to sense a first voltage reversal on the first-phase sense terminal 168 as an indication of the current in the primary winding 114 crossing zero current, and then assert the valley-one output 304 a predetermined period of time thereafter. As another example, if the selected valley is the third valley, the valley detector 302 may be designed and constructed to sense the third voltage reversal on the first-phase sense terminal 168 as an indication of the current in the primary winding 114 crossing zero current for the third time during the oscillation, and then assert the valley-one output 304 a predetermined period of time thereafter. Thus, the valley detector 302 may be also be referred to as a zero-crossing detection (ZCD) circuit.

The example PFC controller 110 further includes a synchronizer 306 defining a valley-one input 308, a drive-one input 310, an offset input 312, and a sync-two output 314. The valley-one input 308 is coupled to the valley-one output 304. The drive-one input 310 is coupled to the first-phase drive terminal 172. The synchronizer 306 receives an offset signal on the offset input 312. The synchronizer 306 is designed and constructed to assert the sync-two output 314 responsive to a switching period of a previous cycle of the first boost phase and the offset signal received on the offset input 312. The timing is explained in greater detail below, but for now suffice it to say that the synchronizer 306 asserts the sync-two output 314 as the trigger for the second boost phase to begin the next interleaved charge mode.

The example PFC controller 110 further defines a valley detector 322 coupled to the second-phase sense terminal 170 and defining a valley-two output 324 and a valley-select input 318. The valley detector 322 is designed and constructed to assert the valley-two output 324 responsive to a voltage sensed on the second-phase sense terminal 170 and an indication of a selected valley received on the valley-select input 318. More particularly, the valley detector 322 is designed and constructed to assert the valley-two output 324 to indicate the reaching the selected valley of the oscillations of the voltage on the drain 158 the example FET 156. If the selected valley is the first valley, the valley detector 322 may be designed and constructed to sense a first voltage reversal on the second-phase sense terminal 170 as an indication of the current in the primary winding 144 crossing zero current, and then assert the valley-two output 324 a predetermined period of time thereafter. As another example, if the selected valley is the second valley, the valley detector 322 may be designed and constructed to sense the second voltage reversal on the second-phase sense terminal 170 as an indication of the current in the primary winding 144 crossing zero current for the second time during the oscillation, and then assert the valley-two output 324 a predetermined period of time thereafter. Thus, the valley detector 322 may be also be referred to as a ZCD circuit.

The example PFC controller 110 further includes a synchronizer 326 defining a valley-two input 328, a drive-two input 330, an offset input 332, and a sync-one output 334. The valley-two input 328 is coupled to the valley-two output 324. The drive-two input 330 is coupled to the second-phase drive terminal 174. The synchronizer 326 receives the offset signal on the offset input 332. The synchronizer 326 is designed and constructed to assert the sync-one output 334 responsive to a switching period of a previous cycle of the second boost phase and the offset signal received on the offset input 332. The timing is explained in greater detail below, but for now suffice it to say that the synchronizer 326 asserts the sync-one output 334 as the trigger for the first boost phase to begin the next interleaved charge mode.

Still referring to FIG. 3, the example PFC controller 110 further comprises driver 336 coupled to the first-phase drive terminal 172. The example driver 336 defines a sync-one input 338, valley-one input 340, and a reset input 342. The sync-one input 338 is coupled to the sync-one output 334 of the synchronizer 326. The valley-one input 340 is coupled to the valley-one output 304 of the valley detector 302. The driver 336 is designed and constructed to assert the first-phase drive terminal 172 when the both the sync-one input 338 and the valley-one input 340 are asserted. The driver 336 is further designed and constructed to de-assert the first-phase drive terminal 172 responsive to assertion of the reset input 342.

The example PFC controller 110 further comprises driver 344 coupled to the second-phase drive terminal 174. The example driver 344 defines a sync-two input 348, a valley-two input 346, and a reset input 350. The sync-two input 348 is coupled to the sync-two output 314 of the synchronizer 306. The valley-two input 346 is coupled to the valley-two output 324 of the valley detector 322. The driver 344 is designed and constructed to assert the second-phase drive terminal 174 when the both the sync-two input 348 and the valley-two input 346 are asserted. The driver 344 is further designed and constructed to de-assert the second-phase drive terminal 174 responsive to assertion of the reset input 350.

Still referring to FIG. 3, the example PFC controller 110 further includes a charge-mode controller 352 coupled to the feedback terminal 180 and a voltage reference $V_{REF}$ representing a setpoint voltage for the voltage output $V_{OUT}$. The charge-mode controller 352 defines a valley-select output 354, a first-phase reset output 356, and a second-phase reset output 358. The valley-select output 354 is coupled to the valley-select input 316 of the valley detector 302 and the valley-select input 318 of the valley detector 322. The example charge-mode controller 352 is designed and constructed to control the timing of the end of each charge mode of each boost converter. Stated equivalently, the charge-mode controller 352 is designed and constructed to control the peak current reached during each charge mode of each boost converters. The charge-mode controller 352 may use any suitable control methodology, such as voltage-mode control, current-mode control, and frequency control. Moreover, in light load operation the charge-mode controller 352 may select later valleys of the oscillations of the respective drain voltages (e.g., third valley, fifth valley) at which to begin each charge mode by driving a valley indication to the valley-select output 354. Oppositely, in heavy load operation the charge-mode controller 352 may select the first valley of the oscillations of the drain voltages at which to begin each charge mode by driving a first-valley indication to the valley-select output 354.

Figure 4:
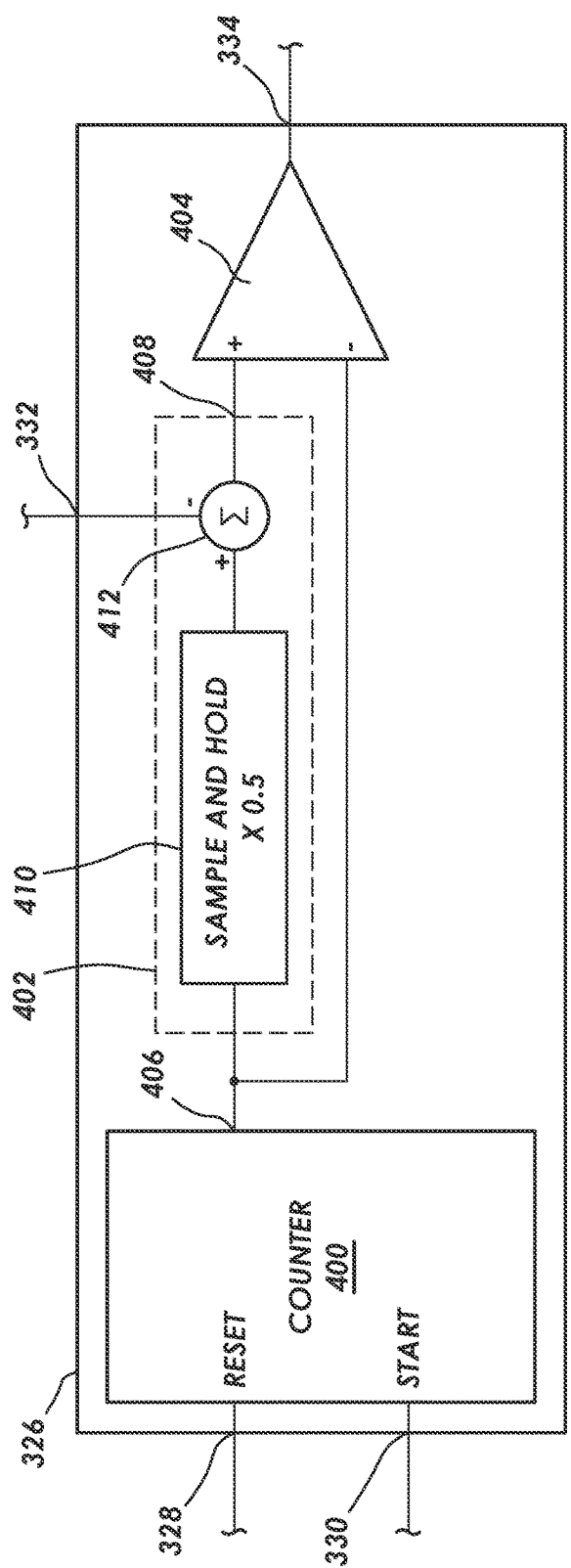
FIG. 4 shows a block diagram of a synchronizer in accordance with at least some embodiments.

FIG. 4 shows a block diagram of an example synchronizer. The synchronizer of FIG. 4 is described as synchronizer 326 associated with the second boost converter, but the synchronizer 306 associated with the first boost converter operates equivalently. In particular, the example synchronizer 326 defines the valley-two input 328, the drive-two input 330, the offset input 332, and the sync-one output 334. Internally, the example synchronizer includes a counter 400, a trigger-point controller 402, and a comparator 404. The example counter 400 includes a reset input defining the valley-two input 328, a start input defining the drive-two input 330, and a count output 406. The counter 400 is designed and constructed to produce a changing count value starting when the drive-two input 330 is asserted at the beginning of a charge mode. The changing count value stops when the when the valley-two input 328 is asserted at the end of the discharge mode, such as within the selected valley. As the counter 400 is counting, the changing count value is updated or driven to the count output 406. In one example, the counter 400 increases the count value over time. The counter 400 may be an analog counter that provides an analog signal with a parameter (e.g., voltage) that indicates the count value, or the counter 400 may be a digital counter producing a digital count value. Thus, the counter 400 produces a count value that is indicative of the switching period of the associated boost converter.

The trigger-point controller 402 is coupled to the count output 406 and thus the first count value, is coupled to the offset input 332 and thus the offset value, and defines a trigger output 408. The trigger-point controller 402 is designed and constructed to generate a trigger-point value based on the count value from a previous switching cycle and the offset value. In particular, the example trigger-point controller 402 samples the count value from the counter 400 just prior to the assertion of the reset of the counter 400. Based on the sampled count value and the offset value, the trigger-point controller 402 generates an analog or digital trigger-point value, and drives the trigger-point value to the trigger output 408.

In one example, the functionality of the trigger-point controller 402 is implemented as a sample-and-hold circuit 410 and a summer 412. The sample-and-hold circuit is designed and constructed to sample the count value at the end of each discharge mode, and produce a half-cycle value. The half-cycle value is a value representing one half (e.g., effectively multiplied by 0.5) of the switching period of the associated boost converter. The sample-and-hold circuit 410 then holds or drives the half-cycle value until the next sample is taken in a subsequent switching period, such as the immediately subsequent switching period. The summer 412 is designed and constructed to subtract the offset value from the half-cycle value, and provide the sum signal as the trigger output 408.

The example synchronizer 326 further includes the comparator 404. The comparator 404 defines a non-inverting input coupled to the trigger output 408 and thus the trigger-point value derived from the previous switching period. The comparator 404 further defines an inverting input coupled to the count output 406 and thus the count value for the current switching period. The comparator 404 includes a compare output that defines the sync-one output 334. It follows that, during a prior switching period the trigger-point controller 402 samples the count value and produce the trigger-point value based on the half-cycle value and the offset value. During the active switching period, the comparator 404 compares the trigger-point value to the incrementing count value, and asserts the sync-one output 334 when the count value crosses (e.g., meets or exceeds) the trigger-point value. In the case of the synchronizer 326 for the second boost converter, assertion of the sync-one output 334 helps synchronize the interleaving as between the second boost converter and the first boost converter of the PFC converter 100. Again, the synchronizer 306 operates equivalently, using its respective inputs, and asserts its sync-two output 314 to help synchronize the interleaving as between the first boost converter and the second boost converter.

Figure 5:
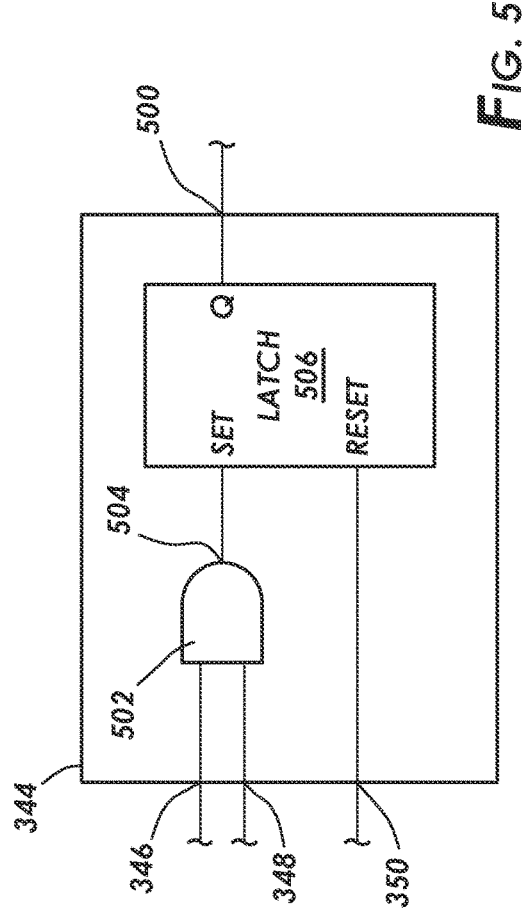
FIG. 5 shows a driver in accordance with at least some embodiments.

FIG. 5 shows a block diagram of an example driver. The driver of FIG. 5 is described as driver 344 associated with the second boost converter, but the driver 336 associated with the first boost converter operates equivalently. In particular, the example driver 344 defines the valley-two input 346, the sync-two input 348, the reset input 350, and a drive output 500. The example driver 344 is designed and constructed to assert the drive output 500 when both the valley-two input 346 and the sync-two input 348 are asserted, and to de-assert the drive output 500 when the reset input 350 is asserted.

Internally, the example driver 344 comprises an AND gate 502 that defines a first input defining the valley-two input 346, a second input defining the sync-two input 348, and an AND output 504. The example driver 344 further includes a latch 506, illustratively shown as a set-reset latch, but any suitable flip-flop or latch may be used. The example latch 506 defines a set input coupled to the AND output 504, and a reset input defining the reset input 350. Thus, when both the valley-two input 346 and the sync-two input 348 are asserted, the AND gate 502 asserts the set input of the latch 506, and the latch 506 asserts the drive output 500. And when the reset input 350 is asserted, the latch 506 de-asserts the drive output 500.

Returning to FIG. 3. When the full-wave rectified voltage input $V_{IN}$ is rising in a half-line cycle, the switching periods of the boost converters are lengthening. Considering the second boost converter, because the assertion of sync-two output 314 from the synchronizer 306 in a subsequent switching period is based on the duration of the prior, shorter switching period of the first boost converter, assertion of the sync-two output 314 in the subsequent switching period precedes the assertion of the valley-two output 324 of the valley detector 322 of the second boost converter. It follows that, based on the example driver discussed in FIG. 5, the next charge mode of the second boost converter is triggered in the selected valley. Similarly for the first boost converter, because the assertion of sync-one output 334 from the synchronizer 326 in the subsequent switching period is based on the duration of the prior, shorter switching period of the second boost converter, assertion of the sync-one output 334 in the subsequent switching period precedes the assertion of the valley-one output 304 of the valley detector 302 of the first boost converter. Again it follows that, based on the example driver discussed in FIG. 5, the next charge mode of the first boost converter is triggered at the selected valley.

However, as the full-wave rectified input voltage $V_{IN}$ is falling in a half-line cycle, the switching periods of the boost converters are shortening or contracting. Considering again the second boost converter, and putting aside for the moment the offset values provided to the offset inputs 312 and 332. Because the assertion of sync-two output 314 from the synchronizer 306 in the subsequent switching period is based on the duration of the prior, longer switching period of the first boost converter, assertion of the sync-two output 314 based only on the half-cycle value in the subsequent switching period results in the assertion of the sync-two output 314 lagging the assertion of the valley-two output 324 of the valley detector 322 of the second boost converter. It follows that, based on the example driver discussed in FIG. 5, valley switching is likely missed. Similarly for the first boost converter, because the assertion of sync-one output 334 from the synchronizer 326 in the subsequent switching period is based on the duration of the prior (longer) switching period of the second boost converter, assertion of the sync-one output 334 based only on the half-cycle value in the subsequent switching period lags the assertion of the valley-one output 304 of the valley detector 302 of the first boost converter. Again it follows that, based on the example driver discussed in FIG. 5, valley switching is likely missed.

Figure 6:
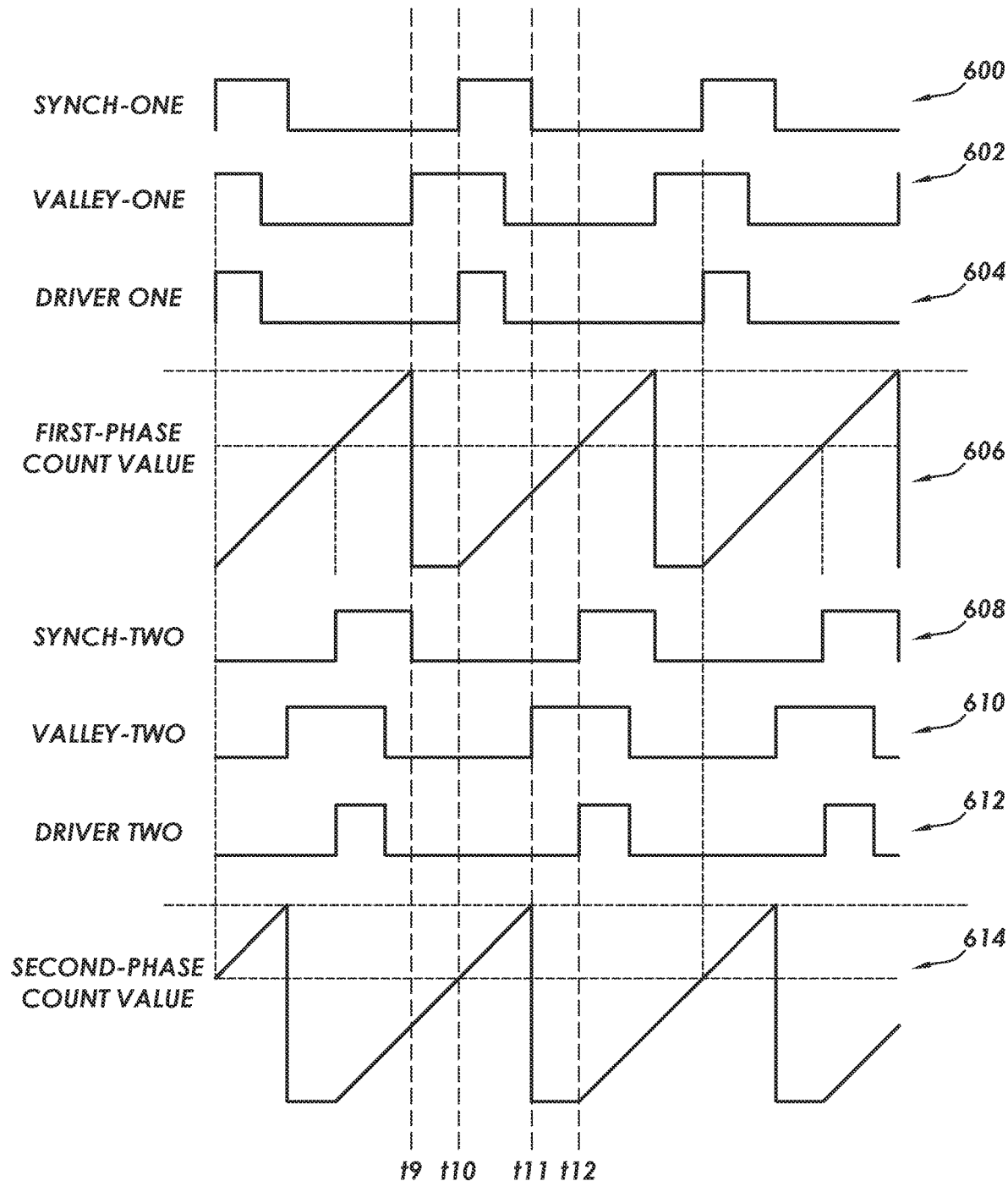
FIG. 6 shows a timing diagram of various signals in the absence of use of an offset signal.

FIG. 6 shows a timing diagram that illustrates the issues during periods of time when the full-wave rectified input voltage $V_{IN}$ is falling during a half-line cycle and the switching periods are shortening or contracting. In particular, FIG. 6 shows an example: sync-one signal 600; valley-one signal 602; first-phase drive signal 604 ("driver one" in the figure); first-phase count value 606; sync-two signal 608; valley-two signal 610; second-phase drive signal 612 ("driver two" in the figure); and second-phase count value 614.

Considering the first boost converter, the charge mode of the first boost converter is triggered when the sync-one signal 600 and valley-one signal 602 are both asserted. The sync-one signal 600 is created based on the second-phase count value 614. In the example timing diagram, the second-phase count value 614 reaches the half-cycle value at time t10. However, because the switching periods are contracting associated with the falling input voltage $V_{IN}$ (not shown in the figure), the sync-one signal 600 goes asserted after the valley-one signal 602 goes asserted at time t9. Because the driver 336 for the first boost converter waits for both the sync-one signal and the valley-one signal to be asserted before starting the charge mode, valley switching is likely missed if the sync-one signal 600 is based only on the half-cycle value.

Now considering the second boost converter, the charge mode of the second boost converter is triggered when the sync-two signal 608 and the valley-two signal 610 are both asserted. The sync-two signal 608 is created based on the first-phase count value 606. In the example timing diagram, the first-phase count value 606 reaches the half-cycle value at time t12. However, because the switching periods are contracting associated with the falling input voltage $V_{IN}$ (not shown in the figure), the sync-two signal 608 goes asserted after the valley-two signal 610 goes asserted at time t11. Because the driver 344 for the second boost convert waits for both the sync-two signal and the valley-two signal to be asserted before starting the charge mode, valley switching is likely missed if the sync-two signal 608 is based only on the half-cycle value.

In accordance with various examples, the offset values provided to the synchronizers 306 and 326 compensate the trigger points to reduce the issues noted in FIG. 6. In particular, the offset value supplied to the synchronizers 306 and 326 is subtracted from the half-cycle values so that the sync signals more closely align with the respective valley signals so that valley switching is better achieved.

Returning to FIG. 3. The example PFC controller 110 thus further includes an offset controller 360. The offset controller 360 defines a valley-one input 362, a valley-two input 364, a driver input 366, a sync-one input 368, a sync-two input 370, an offset output 372, and an offset output 374. The valley-one input 362 is coupled to the valley-one output 304 of valley detector 302. The valley-two input 364 is coupled to the valley-two output 324 of the valley detector 322. The driver input 366 may be coupled to either the first-phase drive terminal 172 or the second-phase drive terminal 174, an in the example of FIG. 3 is coupled to the first-phase drive terminal 172. The sync-one input 368 is coupled to the sync-one output 334 of the synchronizer 326. The sync-two input 370 is coupled to the sync-two output 314 of the synchronizer 306. The offset output 372 is coupled to the offset input 312 of the synchronizer 306. And the offset output 374 is coupled to the offset input 332 of the synchronizer 326.

The example offset controller 360 is designed and constructed to decrement the offset signal driven to the offset outputs 372 and 374 when assertion of the sync-one input 368 precedes the assertion of the valley-one input 308 and assertion of the sync-two input 370 precedes the assertion of the valley-two input 364. Stated in terms of valley switching, if both the first and second boost converters are valley switching, the offset signal is decremented. Further, the offset controller 360 is designed and constructed to increment the offset signal in either of two situations: assertion of the valley-one input 362 precedes the assertion of the sync-one input 368 (e.g., the situation of FIG. 6 at times t9 and t10), indicating a lack of valley switching of the first phase; and assertion of the valley-two input 364 precedes assertion of the sync-two input 370 (e.g., the situation of FIG. 6 at times t11 and t12), indicating a lack of valley switching of the second phase. Stated in terms of valley switching, if either of the first and second boost converters miss valley switching, the offset signal is incremented.

Figure 7:
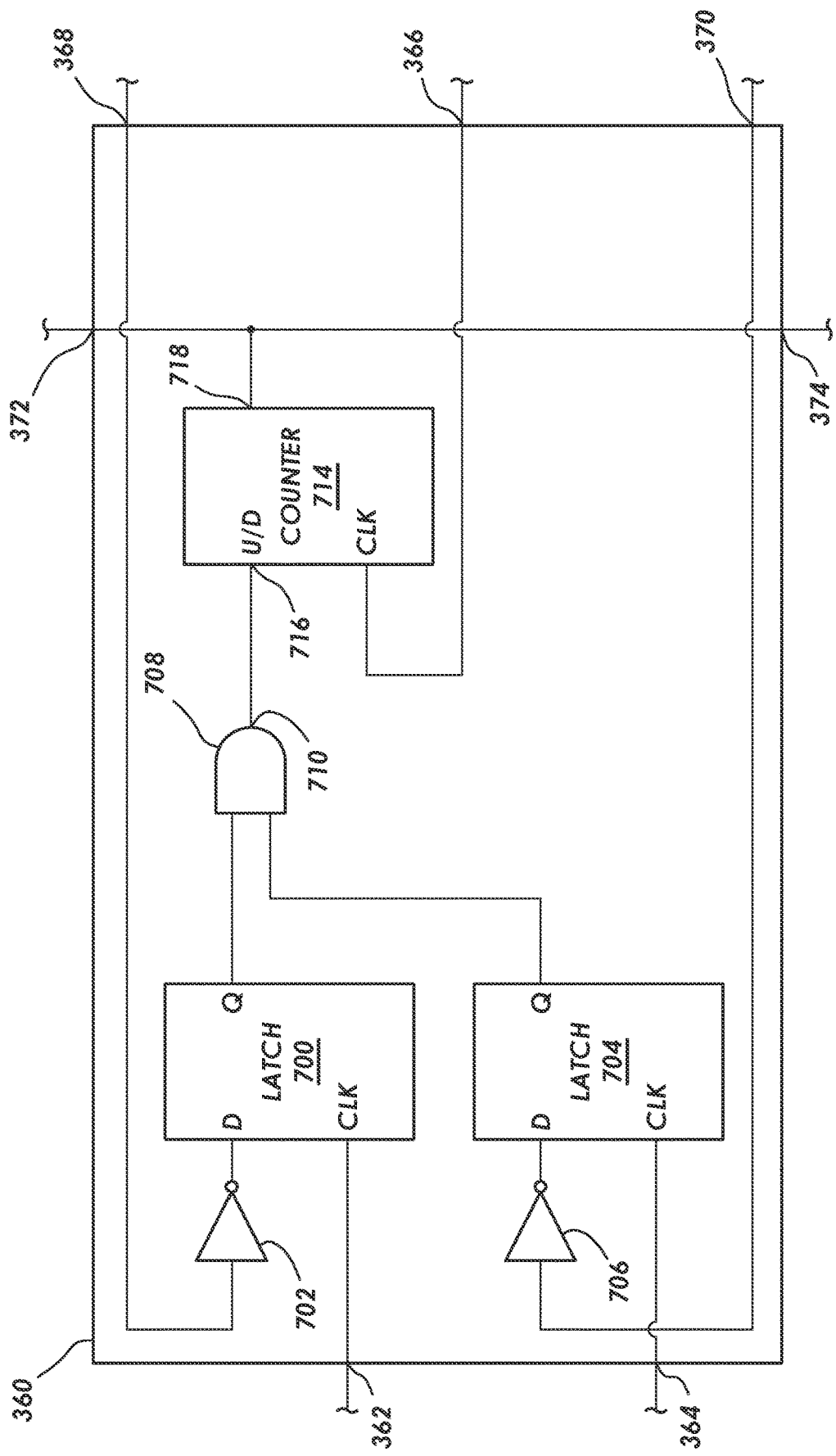
FIG. 7 shows a block diagram of an offset controller in accordance with at least some embodiments.

FIG. 7 shows a block diagram of an example offset controller 360. The example offset controller 360 includes a latch 700. The latch 700 is illustratively shown as a D-latch or D flip-flop, but any suitable latch may be used. The example latch 700 defines a D-input coupled to the sync-one input 368 by way of a logic NOT gate 702. The latch 700 further defines a clock input coupled to the valley-one input 362. The latch 700, in effect, determines the timing as between assertion of the sync-one signal and assertion of valley-one signal. If the assertion of the valley-one signal on the clock input precedes the assertion of the sync-one signal, the latch 700 asserts and holds the Q output, indicating valley switching was missed for the first boost converter. Oppositely, if assertion of the sync-one signal precedes the assertion of the valley-one signal on the clock input, the latch 700 de-asserts and holds the Q output, indicating valley switching was achieved.

The example offset controller 360 further incudes a latch 704 illustratively shown as a D-latch, but any suitable latch may be used. The latch 704 defines a D-input coupled to the sync-two input 370 by way of a logic NOT gate 706. The latch 704 further defines a clock input coupled to the valley-two input 364. The latch 704, in effect, determines the timing as between assertion of the sync-two signal and assertion of valley-two signal. If the valley-two signal on the clock input precedes the assertion of the sync-two signal, the latch 704 asserts and holds its Q output, indicating valley switching was missed for the second boost converter. Oppositely, if assertion of the sync-two signal precedes the assertion of the valley-two signal on the clock input, the latch 704 de-asserts and holds the Q output, indicating valley switching was achieved.

The example offset controller 360 further includes a logic AND gate 708. The logic AND gate 708 defines a first input coupled to the Q output of the latch 700, and a second input coupled to the Q output of the latch 704. Thus, if both latches 700 and 704 assert and hold their respective Q outputs, the AND gate 708 asserts it's AND output 710. Stated in terms of the situation monitored, if both the first boost converter and the second boost converter miss valley switching, the AND gate asserts it's AND output 710. If either or both of the first and second boost converters achieve valley switching, the AND gate 708 de-asserts it's AND output 710.

The example offset controller 360 further includes an up/down counter 714. The up/down counter 714 defines an up/down input 716 coupled to the AND output 710, a clock input coupled to the driver input 366, and a count output 718 coupled to and defining both the offset outputs 372 and 374. When the up/down input 716 is asserted and the clock input transitions, the up/down counter 714 increments the offset value driven to the count output 718. Stated in terms of operation of the PFC converter 100, if both the first and second boost converts miss valley switching, the offset value is incremented to help bring the sync-one signal and the sync-two signal closer in time to the valley-one signal and the valley-two signal, respectively, in the next switching cycle. Oppositely, if one or both of the first and second boost converters achieve valley switching (i.e., the sync signal precedes the valley signal), the up/down input is de-asserted and the up/down counter 714 decrements the offset value. Stated in terms of operation of the PFC converter 100, and taking into account the issue addressed occurs during the falling voltage input $V_{IN}$ in a half-line cycle, if either boost converter achieves valley switching, the offset value is decremented in view of the fact that the next switching cycle will have an even shorter switching period.

Figure 8:
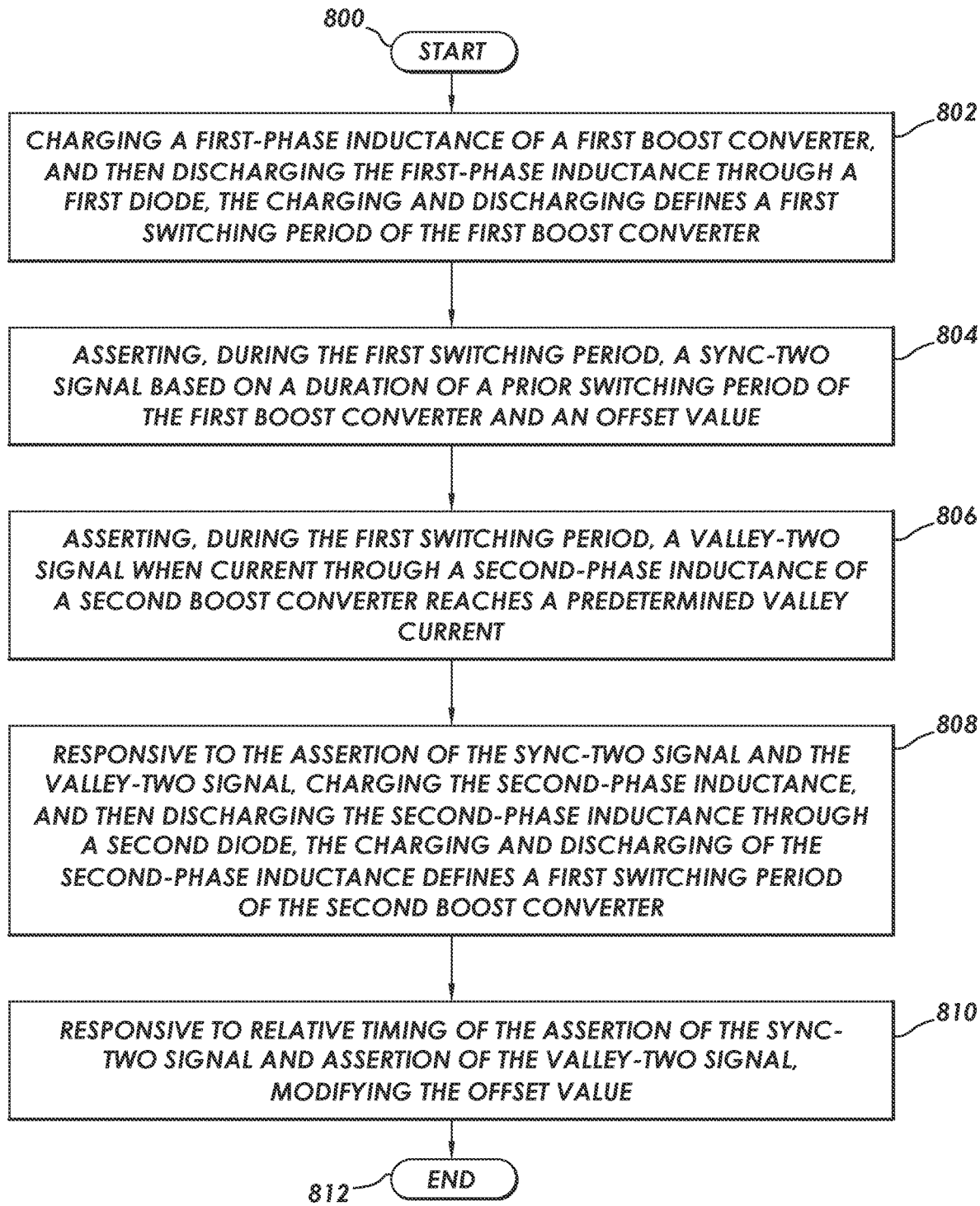
FIG. 8 shows method in accordance with at least some embodiments.

FIG. 8 shows method in accordance with at least some embodiments. In particular, the method starts (block 800) and comprises: charging a first-phase inductance of a first boost converter, and then discharging the first-phase inductance through a first diode, the charging and discharging defines a first switching period of the first boost converter (block 802); asserting, during the first switching period, a sync-two signal based on a duration of a prior switching period of the first boost converter and an offset value (block 804); asserting, during the first switching period, a valley-two signal when current through a second-phase inductance of a second boost converter reaches a predetermined valley current (block 806); responsive to the assertion of the sync-two signal and the valley-two signal, charging the second-phase inductance, and then discharging the second-phase inductance through a second diode, the charging and discharging of the second-phase inductance defines a first switching period of the second boost converter (block 808); and responsive to relative timing of the assertion of the sync-two signal and assertion of the valley-two signal, modifying the offset value (block 810). Thereafter, the method ends (block 812), likely to be restarted in a subsequent switching period.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising:
    charging a first-phase inductance of a first boost converter, and then discharging the first-phase inductance through a first diode, the charging and discharging defines a first switching period of the first boost converter;
    asserting, during the first switching period, a sync-two signal based on a duration of a prior switching period of the first boost converter and an offset value;
    asserting, during the first switching period, a valley-two signal when current through a second-phase inductance of a second boost converter reaches a predetermined valley current;
    responsive to the assertion of the sync-two signal and the valley-two signal, charging the second-phase inductance, and then discharging the second-phase inductance through a second diode, the charging and discharging of the second-phase inductance defines a first switching period of the second boost converter; and
    responsive to relative timing of the assertion of the sync-two signal and assertion of the valley-two signal, modifying the offset value.

2. The method of claim 1 wherein asserting the valley-two signal is performed when the predetermined valley current is in a predetermined valley count.

3. The method of claim 1 wherein modifying the offset value further comprises modifying the offset value when the assertion of the valley-two signal precedes the assertion of the sync-two signal, indicating a lack of valley switching for the charging of the of the second-phase inductance.

4. The method of claim 1 further comprising:
    asserting, during the first switching period of the second boost converter, a sync-one signal based on a duration of a prior switching period of the second boost converter and the offset value;
    asserting, during the first switching period of the second boost converter, a valley-one signal when current through the first-phase inductance reaches a predetermined valley current;
    responsive to the assertion of the sync-one signal and the valley-one signal, again charging the first-phase inductance, and then again discharging the first-phase inductance through the first diode, defining a second switching period of the first boost converter; and
    wherein modifying the offset value further comprises, responsive to relative timing of the assertion of the sync-one signal and assertion of the valley-one signal, modifying the offset value.

5. The method of claim 4 wherein asserting the valley-one signal further comprises asserting the valley-one signal when current through the first-phase inductance reaches the predetermined valley current in the predetermined valley count.

6. The method of claim 4 wherein modifying the offset value further comprises modifying the offset value when assertion of the valley-one signal precedes the assertion of the sync-one signal, indicating a lack of valley switching for the charging of the of the first-phase inductance.

7. The method of claim 4 wherein modifying the offset value further comprises modifying the offset value when assertion of the valley-one signal precedes assertion of the sync-one signal and assertion of the valley-two signal precedes the assertion of the sync-two signal, indicating valley a lack of valley switching for charging of both the first-phase and the second-phase inductance.

8. A controller for controlling a power-factor-correction converter with a first boost converter and a second boost converter, the controller comprising:
    a first-phase sense terminal, a first-phase drive terminal, a second-phase sense terminal, a second-phase drive terminal, and a feedback terminal;
    a first valley detector coupled to the first-phase sense terminal and defining a valley-one output, the first valley detector configured to assert the valley-one output responsive to a voltage valley sensed by way of the first-phase sense terminal;
    a first synchronizer coupled to the valley-one output and defining a sync-two output and a first offset input, the first synchronizer configured to assert the sync-two output based on duration of a switching period of a previous switching cycle of the first boost converter and an offset signal received on the first offset input;
    a second valley detector coupled to the second-phase sense terminal and defining a valley-two output, the second valley detector configured to assert the valley-two output responsive to a voltage sensed by way of the second-phase sense terminal;

a second synchronizer coupled to the valley-two output and defining a sync-one output and a second offset input, the second synchronizer configured to assert the sync-one output responsive to a duration of a switching period of a previous switching cycle of the second boost converter and the offset signal received on the second offset input;

a first-phase driver coupled to the first-phase drive terminal, the valley-one output, and the sync-one output, the first-phase driver configured to assert the first-phase drive terminal responsive to assertion of the valley-one output and the sync-one output;

a second-phase driver coupled to the second-phase drive terminal, the valley-two output, and the sync-two output, the second-phase driver configured to assert the second-phase drive terminal responsive to assertion of the valley-two output and the sync-two output;

an offset controller coupled to the valley-one output, the sync-one output, the valley-two output, and the sync-two output, the offset controller configured to drive an offset signal to the first and second offset inputs, and the offset controller configured to:

increment the offset signal when assertion of the valley-one output precedes the assertion of the sync-one output and assertion of the valley-two output precedes the assertion of the sync-two output, indicating both the first and second phases missed valley switching; and decrement the offset signal on occurrence of at least one situation from a group comprising: assertion of the sync-one output precedes assertion of the valley-one output; and assertion of the sync-two output precedes assertion of the valley-two output.

9. The controller of claim 8 wherein the first synchronizer further comprises:

a first counter coupled to the valley-one output and the first-phase drive terminal, the first counter configured to measure a duration between assertion of the first-phase drive terminal and the assertion of the valley-one output, and thereby produce a first count value;

a first trigger-point controller coupled to the first count value and the offset signal, the trigger-point controller configured to generate a first trigger-point value based on a count value from the previous switching cycle of the first boost converter and the offset value;

a first comparator defining first compare input coupled to the first trigger-point value, a second compare input coupled to the first count value, the first comparator configured to assert the sync-two output when the first count value crosses first trigger-point value.

10. The controller of claim 9 wherein the trigger-point controller further comprises:

a first sample and hold circuit configured to read the first count value, produce a half-cycle value, and hold the half-cycle value for a least a portion of a subsequent switching period; and a first summer having a first input coupled to the half-cycle value, a second input coupled to the first offset input, and sum output coupled to the second compare input, the first summer configured to produce a sum signal being the first trigger-point value.

11. The controller of claim 10 wherein the second synchronizer further comprises:

a second counter coupled to the valley-two output and the second-phase drive terminal, the second counter configured to measure a time duration between assertion of the second-phase drive terminal and the assertion of the valley-two output, and thereby produce a second count value;

a second trigger-point controller coupled to the second count value and the offset signal, the second trigger-point controller configured to generate a second trigger-point value based on a count value from the previous switching cycle of the second boost converter and the offset value; and a second comparator defining a first compare input coupled to the second trigger-point value, a second compare input coupled to the second count value, and the sync-one output, the second comparator configured to assert the sync-one output when the second count value crosses second trigger-point value.

12. The controller of claim 8 wherein the first synchronizer further comprises:

a first comparator defining first compare input, a second compare input, and the sync-two output;

a first counter coupled to the valley-one output and the first-phase drive terminal, the first counter configured to measure a time duration between assertion of the first-phase drive terminal and the assertion of the valley-one output, and thereby produce a first count value applied to the first compare input;

a first sample and hold circuit configured to read the first count value, produce a half-cycle value, and hold the half-cycle value for a least a portion of a subsequent switching period;

a first summer having a first input coupled to the half-cycle value, a second input coupled to the first offset input, and a sum output coupled to the second compare input, the first summer configured to produce a sum signal;

the second comparator configured to assert the sync-two output when the first count value crosses the sum signal.

13. The controller of claim 12 wherein the second synchronizer further comprises:

a second comparator defining a first compare input, a second compare input, and the sync-two output;

a second counter coupled to the valley-two output and the second-phase drive terminal, the second counter configured to measure a time duration between assertion of the second-phase drive terminal and the assertion of the valley-two output, and thereby produce a second count value applied to the first compare input of the second comparator;

a second sample and hold circuit configured to read the second count value, produce and hold a half-cycle value for a portion of the subsequent switching period;

a second summer having a first input coupled to the half-cycle value of the second sample and hold circuit, a second input coupled to the second offset input, and sum output coupled to the second compare input of the second sample and hold circuit, the second summer configured to produce a sum signal;

the second comparator configured to assert the sync-two output when the second count value crosses the sum signal of the second summer.

14. A power-factor-correction (PFC) converter comprising:

a first-phase transformer defining a first primary winding with a first lead coupled to a voltage input and a second lead, and an auxiliary winding defining a first-phase sense lead;

a first-phase diode defining an anode coupled to the second lead, and a cathode defining a voltage output;
a first-phase electrically-controlled switch defining a first connection coupled to the second lead, a second connection coupled a reference voltage, and a control input;
a second-phase transformer defining a second primary winding with a first lead coupled to the voltage input and a second lead, and an auxiliary winding defining a second-phase sense lead;
a second-phase diode defining an anode coupled to the second lead of the second-phase transformer, and a cathode coupled to the voltage output;
a second-phase electrically-controlled switch defining a first connection coupled to the second lead of the second-phase transformer, a second connection coupled the reference voltage, and a control input;
a controller coupled to the first-phase sense lead, the second-phase sense lead, the control input the first-phase electrically-controlled switch, and the control input of the second-phase electrically-controlled switch, the controller configured to:
  charge the first primary winding, and then discharge the first primary winding through the first-phase diode, the charge and discharge defines a first switching period of the first primary winding;
  assert, during the first switching period, a sync-two signal based a duration of a prior switching period of the first phase and an offset value;
  assert, during the first switching period, a valley-two signal when current through the second primary winding reaches a predetermined valley current;
  responsive to the assertion of the sync-two signal and the valley-two signal, charge the second primary winding, and then discharge the second primary winding through the second-phase diode, the charge and discharge of the second primary winding defines a first switching period of a second phase of the PFC converter; and
  responsive to relative timing of the assertion of the sync-two signal and assertion of the valley-two signal, modify the offset value.

15. The PFC converter of claim 14 wherein when the controller asserts the valley-two signal, the controller is configured to assert the valley-two signal when the predetermined valley current is in a predetermined valley count.

16. The PFC converter of claim 14 wherein when the controller modifies the offset value, the controller is further configured to modify the offset value when the assertion of the valley-two signal precedes the assertion of the sync-two signal, indicating a lack of valley switching for the charging of the of the second primary winding.

17. The PFC converter of claim 14 wherein the controller is further configured to:
  assert, during a first switching period of the second primary winding, a sync-one signal based on a duration of a prior switching period of the second primary winding and the offset value;
  assert, during the first switching period of the second primary winding, a valley-one signal when current through the first primary winding reaches a predetermined valley current;
  responsive to the assertion of the sync-one signal and the valley-one signal, again charge the first primary winding, and then again discharge the first primary winding through the first-phase diode, defining a second switching period of the first primary winding; and
  wherein modification of the offset value further comprises, responsive to relative timing of the assertion of the sync-one signal and assertion of the valley-one signal, modify the offset value.

18. The PFC converter of claim 17 wherein when the controller asserts the valley-one signal, the controller is further configured to assert the valley-one signal when current through the first primary winding reaches the predetermined valley current in the predetermined valley count.

19. The PFC converter of claim 17 wherein when the controller modifies the offset value, the controller is further configured to modify the offset value when assertion of the valley-one signal precedes the assertion of the sync-one signal, indicating a lack of valley switching for the charge of the of the first primary winding.

20. The PFC converter of claim 17 wherein when the controller modifies the offset value, the controller is further configured to modifying the offset value when assertion of the valley-one signal precedes assertion of sync-one signal and assertion of the valley-two signal precedes the assertion of the sync-two signal, indicating a lack of valley switching for charging of both the first and second primary windings.

* * * * *